Dec. 4, 1951 V. H. HIATT 2,576,938

VACUUM TUBE AMPLIFIER

Filed March 15, 1949

INVENTOR:
VERL H. HIATT
BY

ATT'Y

Patented Dec. 4, 1951 2,576,938

UNITED STATES PATENT OFFICE 2,576,938

VACUUM TUBE AMPLIFIER

Verl H. Hiatt, Noblesville, Ind., assignor to the United States of America as represented by the Secretary of the Navy Application March 15, 1949, Serial No. 81,561

13 Claims. (Cl. 332—31)

Figure 1:
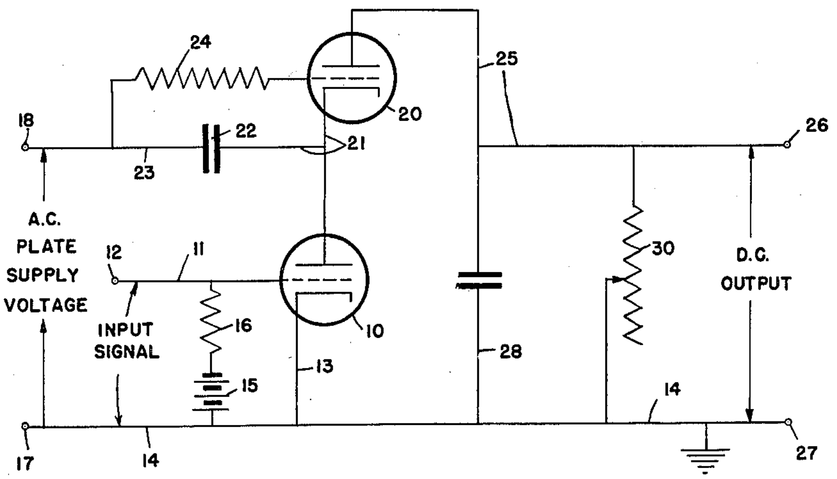

(Granted under the act of March 3, 1883, as amended April 30, 1928; 370 O. G. 757)

This invention relates in general to vacuum tube amplifiers and more particularly to self rectifying amplifiers which are operated from an alternating current source of power. The invention is in the apparatus, arrangement of circuit connections, and means for amplifying direct current voltages as well as alternating current voltages, and direct coupling of stages in a multistage system, and with means for obtaining a related output in the form of impulses, sawtooth waves, or substantially smooth direct current.

Among the objects of the invention are to provide an amplifier which operates from an alternating current supply voltage, with proper input and output polarities to permit direct coupling in multistage amplification operating from the same plate voltage, and to permit direct coupled degeneration for stabilizing a single stage or an odd number of directly coupled stages.

Another object of the invention is to provide an amplifier with a filtered direct-current output which may range in value from zero to approximately twice the peak alternating current plate supply voltage in accordance with the input signal voltage changes; and either single stage or multistage, to amplify direct current signals, extremely low frequency alternating current signals, and higher alternating current frequencies limited only by the frequency of the alternating current plate supply voltage.

Another object of the invention is to provide an amplifier sensitive to the phase relation between the plate supply voltage and an input alternating current signal, responsive to a change in the frequency of the plate supply voltage, and sensitive to the value of a capacitive component as well as to an input signal voltage.

Still another object of the invention is to provide an amplifier in which a slight modification of the output circuit will result in an output of D. C. (direct current) impulses at a frequency dependent upon the frequency of the A. C. (alternating current) supply voltage, and with an amplitude dependent upon the characteristics (amplitude, phase, frequency, polarity, wave form, etc.) of the input signal voltage and with a phase relation relative to the A. C. supply voltage which may be varied by the addition or accumulation of a voltage in the output circuit.

A further object of the invention is to provide an amplifier in which proper values of R (resistance) and C (capacity) in the output circuit will result in an output of sawtooth waves at a frequency dependent upon that of the A. C. supply voltage and with an amplitude dependent upon the characteristics of the input signal voltage and with a phase relation relative to the A. C. supply voltage which may be varied by the addition or accumulation of a voltage in the output circuit.

Still further objects of the invention are to provide an amplifier which may be conveniently set free from variations in the A. C. plate supply voltage by choosing the proper circuit components and regulating the amplitude of the positive half cycles; which may be made regenerative by A. C. coupled feed-back or super-regenerative by the combination of regenerative and degenerative feed-back or by conventional methods; and which, with proper circuit connections, will render the output current substantially independent of output load variations from zero to a maximum limited by the available plate supply voltage.

A still further object is to provide an A. C. operated amplifier which may be utilized in all conventional electronic circuits, such as phase inversion, push pull, multivibrator, flip-flop or trigger circuits, counting and timing circuits, relay systems, computing circuits, and the like, as particllary found in television, radar, and control devices.

Figure 2:
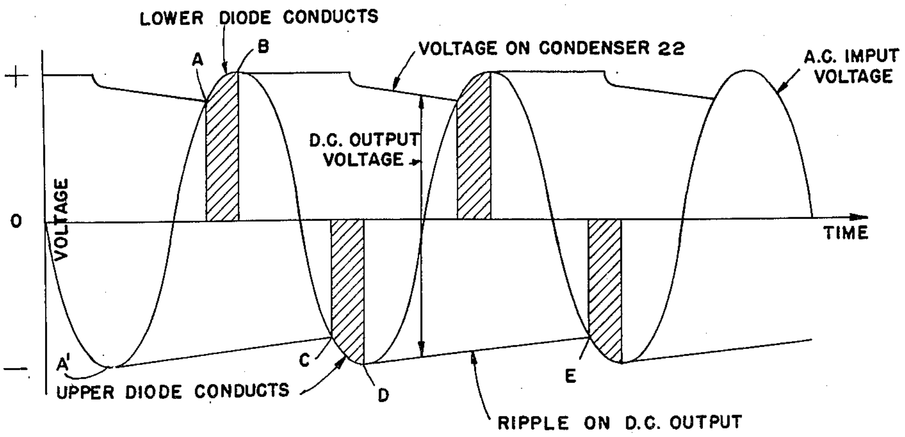

Other objects of the invention will appear in the specification and will be apparent from the accompanying drawings, in which Fig. 1 is a schematic diagram of a fundamental amplifier embodying the principles of this invention; and Fig. 2 is a diagrammatic representation of the voltage doubling characteristics of a system as shown in Fig. 1.

Single stage amplifiers are limited in voltage and power amplification and direct coupled amplifiers obtain the grid signal voltage for one tube directly from the plate impedance of the preceding tube. This produces a high grade amplifier but one drawback is the necessity of a plate voltage supply equal to the sum of all the plate voltages and the bias voltages required for all stages. This is equivalent to a separate power supply for each tube.

Some remedies for the difficulties encountered are: a balancing system with direct coupled reverse feed-back along with regulated power supply; conversion of the D. C. signal to A. C., then amplification of the A. C. signal in a conventional manner and reconversion to a D. C. output signal; the provision of a direct coupled two (or more) stage amplifier with multiple A. C. plate supply voltage; capacity operated relays; a blocking tube oscillator capable of high frequency operation; and the use of various types of relaxation oscillators.

The main disadvantage of the fundamental amplifier is that a separate plate voltage supply is required for direct coupling to a second stage or to most other electronic devices. Where alternating current is used for the plate supply voltage this disadvantage means only the use of separate transformers or a single transformer with separately shielded secondaries. However, for aircraft work in particular, this seems to be an important disadvantage when the physical dimensions and weight of a transformer are considered. Tube development is toward smaller and smaller tubes and there is now an excellent supply of standard miniature tubes for selection. The equivalent of two separate tubes in one miniature envelope is now common practice.

Likewise, condenser and resistance manufacturing progress has been focused on smaller physical dimensions. One of the latest movements in this direction has been printed circuits. But reduction in weight and dimensions of the transformer has lagged behind and it seems improbable that much can be done about the iron and copper necessary to build a transformer. The only solution appears to be the elimination of the transformer wherever possible. The smaller A. C.–D. C. radio is representative of the trend toward simplification, weight, and space saving, and economy.

In this invention, advantage is taken of resistor, condenser, and tube development to further eliminate the iron core transformers in electronic equipment and to open a new approach to the solution of many electronic problems. The familiar electronic procedure is to begin with an A. C. line voltage, convert it to a D. C. voltage, and then operate on electronic circuit to give amplifications or oscillations such as sine waves, rectangular waves, impulses, sawtooth waves, and the like; or detection of a voltage, current, or capacitance change. This invention proposes to begin with A. C. power and directly operate a simple electronic circuit to give most of the usual desired results or outputs. The higher frequency A. C. power (400 cycles) available in aircraft is advantageous for the new method.

In multistage systems there is the difficulty or inability to provide direct coupled negative feed-back. This feature is important in obtaining amplification practically independent of changes in tube characteristics and an effectively low impedance output, and also in antihunt schemes for automatic controls. Even in A. C. degenerative feedback, there exists the problem of phase relation. In an amplifier having three or more stages, the output voltage may be in phase with the input signal voltage for a certain range of frequencies while for higher frequencies this relationship may be reversed. This cannot occur in the present A. C. operated amplifier, for the phase relation of each stage is largely controlled by the common A. C. voltage supply.

The requirement for a larger output voltage to feed a low mu triode or to electrostatically deflect a cathode ray beam is a disadvantage often encountered. Special means are usually resorted to, to overcome this disadvantage, while the present invention has the characteristics of the voltage doubler and the inherent ability to supply voltages almost twice the peak A. C. supply voltage.

Most vacuum tubes are controlled by varying the control grid voltage from zero to a negative voltage in the region of the cut-off valve and this generally introduces a design problem of providing the necessary bias. The characteristic output of the present A. C. operated amplifier is a voltage ranging from zero to a maximum negative value.

An excellent example of the disadvantages of the old methods are the amplifiers used in cathode ray oscilloscopes. When an amplifier is inserted between the signal and the deflection plates, the frequency response can be no better than that of the amplifier. Cathode ray oscilloscopes are usually employed in the study of A. C. phenomena, and this fact, coupled with the well known difficulties of designing a highly sensitive amplifier for direct voltages, is probably the reason why no maker of oscilloscopes has yet seen fit to incorporate D. C. amplification in them. This is a great disadvantage because the loss of the D. C. component of a voltage sometimes makes it hard to obtain a proper view of the relative size of the A. C. component of a given rectified voltage, for example: Some manufacturers have succeeded in pushing the lower frequency limit to about two cycles per second which causes the inconvenience of slow recovery during switching due to the long time constant of resistance-capacitance coupling. A high frequency supply employed to operate the present amplifier may present the possibility of a solution to this problem.

It appears that all A. C. operated amplifiers are phase sensitive and able to produce an output voltage with a frequency equal to the difference in frequency between that of the A. C. supply voltage and the input signal frequency, but they all suffer the common disadvantages where direct coupling is desirable as in automatic control systems with the essential antihunt feedback methods, for example: Such amplifiers are also frequency responsive, that is, the output voltage or current may vary with the frequency of the A. C. supply, but the relation of the output to the supply frequency may be complicated by the impedance of the A. C. supply means. In control systems where the frequency response characteristic of an A. C. operated amplifier is desirable, this invention provides the simplicity of a direct connection to a generated A. C. and an output directly proportional to the frequency, as well as grid control phase sensitive to the output of a frequency detector for instance, and in addition to all this, a constant current output characteristic so that the amplifier is independent of load changes.

Most capacity sensitive devices have a nonlinear relationship between the output voltage and the change in capacity and consequently are limited in applications, in measurements and position indicating schemes. This disadvantage seems to be absent in the present invention because a measured quantity of charge is placed upon a condenser, dependent upon the capacitance, and then is transferred to a storage means with a fixed discharge rate.

Pulse generating methods have the disadvantage of requiring special transformers which are bulky, expensive, not easily procured or made, and a source of disturbance to other components due to their magnetic fields. The pulse or peaking transformer generates a pulse of alternate polarity each half cycle of the A. C. supply. For many applications this would require additional equipment to reduce the two polarity pulses to a single polarity occurring each cycle. Where a sharp low power pulse is employed, this invention offers a convenient, inexpensive means along with all the other advantages of control.

Sawtooth wave generation has always involved a struggle to obtain a fast return line, a sharp cornered triangular shape, and a linear sweep or discharge rate. To one familiar with these problems, the degree of perfection in the sawtooth waves generated from the pulses of power in the output of this invention are particularly apparent. It is obvious that a pulse generator free from the disadvantages of an inductive lag as in this invention should produce a superior quality pulse and also a better triangular wave.

Regulation of the plate supply voltage is a common desirable practice in electronics, and usually involves the addition of considerable equipment and the waste of power in the form of heat. Independence from power supply fluctuations may be obtained in this invention by regulation of alternate half cycles of the A. C. supply. This involves only one half of the regulation and the consequent power waste found in the old systems.

As a generator of a constant direct current this invention may find ready employment, especially in radar systems. All methods require conversion of A. C. to D. C. and then regulation of the D. C. voltage followed by a pentode connection to obtain a constant current. A constant current output with variations in load is an inherent characteristic of the present invention.

Regeneration in a single stage of amplification has always required a transformer or some intricate combination of resistance and capacitance. In the present invention regeneration can be obtained easily by the addition of one condenser and a resistance for A. C. feed-back without worry about phase relations.

Old methods suffer generally in many respects from the use of transformers. This invention provides an ideal remedy even if it is necessary to generate a higher frequency for plate supply voltage in order to solve a given problem. Aside from transformers, the multivibrator is an unstable oscillator and power must be supplied to it from an external source to synchronize the oscillations. The present amplifier may be used in a multivibrator hook-up and using the synchronizing voltage as the operating voltage. As a frequency divider, the output would be locked in with the plate supply voltage. Other disadvantages of old methods will appear and will be more readily understood in the following description of this invention.

Referring now more particularly to the drawings, this invention together with other objects and advantages will be more clearly described and explained in a modified voltage doubler circuit, a grid control being added to each of the rectifiers and connections thereto such that the control voltage of one grid reacts in accordance with the other grid control voltage and to the alternations in polarity of the A. C. power supply.

The amplifier comprises a triode vacuum tube 10 having a conductor 11 connecting its grid and an input signal terminal 12. The cathode is connected by a conductor 13 with a grounded electrical supply main having a supply terminal 17. A grid supply battery 15 and a grid leak resistance 16 are connected in series between the conductor 11 and the grounded main 14 and may be arranged in value to suit the condition imposed by the circuit from which the input signal comes.

Another triode vacuum tube 20 has its cathode connected by a conductor 21 with the plate of tube 10 and with one side of a condenser 22. The other side of the condenser is connected by a conductor 23 with a terminal 18, which with the terminal 17 for the supply main 14 provides for the application of the A. C. plate supply voltage. A grid leak resistance 24 is connected to the grid of tube 20 and to conductor 23 at the outside of the condenser 22 so that the voltage across the condenser will control the grid.

Connected to the plate of tube 20 is a conductor 25 which is connected to one terminal 26 for the D. C output, a terminal 27 on the grounded main 14 constituting the other connection for the D. C. output. Connected in parallel between the conductor 25 and the grounded main 14 is a condenser 28 and a resistance 30. Power for the tube heaters may be supplied directly from the A. C. plate supply voltage, or through a transformer or by any other conventional method.

When a signal is applied to the grid of tube 10 or the bias is such that the tube will conduct, a positive half cycle of the A. C. plate supply will charge the condenser 22 through the tube 10 to the peak voltage of the A. C. wave, less the voltage drop across the tube and less the small discharge loss through the normally high resistance 24. Then at the end of this positive half cycle and while the condenser 22 is charged and the grid of tube 20 is positive, due to the charge, the plate supply voltage polarity reverses and adds the potential resulting from the charge on the condenser 22 to charge the condenser 28 through the tube 20. However, the condenser 28 does not receive its full charge because it begins discharging into the load resistance 30 as soon as it begins charging, and in addition, the charging of the output condenser is stopped soon after the condenser 22 has discharged and starts charging in the opposite direction which results in biasing the tube 20 to a point near cut-off. On the next positive half cycle the process is repeated and thus continues to maintain a charge on condenser 28. As in any half wave rectifier, the ripple frequency corresponds to the input frequency.

The amplitude and the wave form of the ripple may be altered by changing any of the circuit components. For very high value of resistance 30 the discharge of the condenser 28 will be very slow which will permit the potential to build up to almost twice the peak A. C. voltage and to be maintained at a substantially constant value. At the same time the condenser 22 will maintain a substantially constant D. C. potential approximately equal to the peak A. C. voltage and the grid of tube 20 will be continuously positive. Under these conditions the small amount of ripple found in the output will have the familiar wave form obtained from half wave rectifiers which may be described as a triangular wave with the peak rounded off.

If the resistance 30 is of lower value, the condenser 28 will discharge to a lower potential before the next charging pulse passes through tube 20. Consequently the amplitude of the ripple is greater. Also if the impedance of the output circuit, comprising the condenser 28 and the resistance 30, is low enough to pass sufficient current to discharge the condenser 22 and charge it to a difinite potential of reverse polarity, the tube 20 will be biased to cut-off and the ripple flow stopped suddenly. The resulting wave form of the greater ripple voltage will now be triangular with a sharp corner at the peak, usually called a sawtooth wave.

It may appear that under these conditions, the flow of current through the tube 20 would gradually decrease as the condenser 22 is charged toward the cutoff potential of the tube, and this is the characteristic which brings out an important detail of this invention. There are two modes of operation. One is the obvious manner and the other is not so apparent. In the obvious mode of operation, the time constant of the circuit, comprising the condenser 22 and the tube 20, is long relative to the period of the A. C. supply voltage. The other mode of operation is when the time constant of the circuit, is very short relative to the period of the A. C. supply voltage.

With a relatively large condenser 22, that portion of the tube's static characteristic curve above the curvature near the cutoff is most interesting, while with a small capacitance for the condenser 22, the impedance of the circuit is so great that the tube resistance is relatively negligible until the curvature near cutoff is reached, where the high resistance of the tube is an effective part of the high impedance.

Therefore the value of capacitance 22 will depend upon the application of the amplifier and the output results desired. For power output and of the control applications, a relatively large capacitance will be used, while for narrow impulses and sawtooth waves, a relatively small capacitance is necessary. For constant current flow a small capacitance is required, and as a capacity sensitive amplifier the condenser must be very small.

The A. C. operated amplifier as diagrammatically represented in Fig. 1 has an output voltage which is negative with respect to the ground and that increases in value with a positive input signal applied to the grid of tube 10. In other words, there is a phase difference of 180 degrees between the input signal and the amplified output just as in conventional amplifiers. Hence the bias battery 15 could be omitted and the grid leak resistor 16 connected across a part of the output load resistance 30 to obtain self-bias and degenerative feedback. Self-bias from a cathode resistor and a filter condenser in the cathode circuit of tube 10 is also a practical method as in conventional circuits. In cascade or multiple amplification the output polarity of one stage is suitable for feeding the grid of the next stage, and the value of the output voltage under zero signal conditions can be adjusted by selection of appropriate circuit components, particularly condenser 22 and tubes of high or low mu, or the A. C. plate supply voltage may be adjusted by the use of a voltage divider.

High values of output voltage, ranging from zero to approximately twice the peak A. C. supply voltage require the use of relatively large capacitances 22 and 28, and for greater power output, low mu triodes plus additional filtering will be necessary.

The operation of this amplifier depends upon the signal on the control grid of tube 10 during the conduction period of the tube, which thus determines the amount of charge placed on a given condenser 22 and hence the amount of energy transferred to the output circuit. The signal may be a steady direct current, a pulsating direct current, or an alternating current, but the effect upon the amplifier depends upon the integral of the instantaneous values of the signal during the conductance period of the tube 10. Obviously then, the amplifier is phase sensitive and suffers the disadvantage of poor fidelity and slow response unless the frequency of the A. C. plate supply voltage be high relative to the frequencies to be reproduced.

Since the output of this amplifier is dependent upon the transfer of a measured amount of energy from condenser 22, the output voltage will naturally vary with the rate of transfer as occurs with a change in the frequency of the A. C. plate supply voltage. Advantage of this, along with the phase sensing characteristic have been utilized by this inventor in an automatic frequency control system for a 400 cycle inverter.

This amplifier may be constructed to provide sensitivity to small changes in the capacitance of the condenser 22 by building a high impedance amplifier with the critical capacitance of condenser 22 extremely small, so that minute changes in capacitance will represent a large percentage of the total. Time may be thus allowed for the storage of sufficient energy in condenser 28 to operate a relay or other device, or the output may be amplified through additional stages, or regenerative amplification may be used.

Where it is desirable to obtain an output of single polarity impulses, occurring each cycle of the A. C. plate supply voltage, this amplifier may be constructed for the previously mentioned other mode of operation and the filter condenser 28 may be omitted; or the output R. C. (resistance 30, condenser 28) circuit may be connected in series with a resistance, across which narrow negative pulses will appear. The edges of the pulses may be sharpened by the addition of chokes or peaking coils just as in conventional video amplifiers. The amplitude and the width of the pulses may be varied by an input signal on the grid of tube 10. The time relation with the A. C. plate supply voltage may be varied by introducing a voltage in series with the output circuit, or by varying the accumulated potential of condenser 28. That is, with a pulse output resistor in series with the R. C. output circuit, the phase of the pulses across the series resistance may be varied by varying the resistance 30. Sawtooth waves always seem to be the results of the integration of pulses and therefore they are conveniently obtained from this amplifier.

Due to the limiting action of the tube 20 upon the current flow during one half cycle of the A. C. plate supply voltage, it is only necessary to provide a limitation for the other half cycle to enjoy independence from supply voltage fluctuations. A successful method and means for this amplifier is to use a cold cathode gas regulator tube and a series dropping resistor across the A. C. plate supply voltage. Higher frequency supply voltages require a biased diode limiter to accomplish the same results.

Referring again to the second mode of operation, when the capacitance of the condenser 22 is relatively small, the time of conduction of tube 20 relative to the sine wave power supply seems to depend upon the plate bias potential resulting from the charge on the filter condenser 28. This bias potential can be changed by varying the load resistance 30, but the pulse current remains substantially constant as the pulse occurs at different positions along the more linear portion of the sine wave. A test revealed only a five percent change in current during a change in load resistance from approximately 300 ohms to one megohm.

With a triangular wave output from this amplifier, an alternating current wave may be obtained by capacitively coupling the single polarity wave to a second load resistance. Part of this A. C. output may then be feed-back to the grid of tube 10 resulting in regeneration. The grid circuit may contain a gridleak and condenser combination as found in regenerative and super-regenerative amplifiers to provide a degenerative bias. Or such a degenerative bias may be obtained from the load resistance 30.

Two stages of amplification embodying my invention may be connected in the conventional manner of such circuits as phase inversion, push-pull, multivibrator, trigger circuit, counting circuits, timing circuits, relay circuits, and the like.

*Voltage doubler operation.*—In considering the operation of this amplifier, it may be best explained and understood by reference generally to a voltage double, and then to consider the effect of adding grid control to one rectifier, and then grid control of both rectifiers with external control of one and internal or self control of the other.

A half-wave voltage doubler or multiplier comprises lower and upper diode tubes in the places of tubes 10 and 20 connected through condenser 22 to the input A. C. plate supply terminals as shown in Fig. 1, and an output comprising charging condenser 28 and load resistance connected across conductors 25 and 14 leading to the output terminals 26 and 27. In this circuit, when the plate of the lower diode tube (as 10) is positive, the tube passes current charging condenser 22 to a voltage equal to the peak input voltage less the tube drop. When the A. C. input polarity reverses at the end of a half cycle, the voltage resulting from the charge in the condenser 22 is added to the A. C. input voltage, and with the upper diode (as 20) thereupon similarly charging the condenser 28. However, the condenser 28 does not receive its full charge because it begins discharging into the load resistance 30 as soon as the upper diode becomes conductive. For this reason the output is somewhat less than twice the peak input voltage. As in any half-wave rectifier, the ripple frequency corresponds to the input frequency.

A more specific example of the operation is obtained by observing the position in the A. C. cycle during which each diode conducts current and the relation of the D. C. output voltage to the A. C. input voltage, as represented by Fig. 2. When the load on the D. C. output is small, the condenser 28 will discharge slowly as represented by the line D—E. Actually this line is not straight as it has the characteristic condenser discharge curvature. During this time the lower diode conducts a charge to the condenser 22 as represented by the shaded area between A and B. The charging of the condenser 22 and the conduction of the lower diode cannot begin until the positive half of the A. C. input voltage reaches the point A where the instantaneous value of the sine wave is equal to the opposing potential resulting from the remaining charge on the condenser 22. From A to B, the A. C. potential is high enough to cause conduction through the lower diode resulting in an addition to the charge on condenser 22. Beyond the point B, the A. C. potential falls, leaving the lower diode biased by the charge on condenser 22. The A. C. cycle then reverses and adds to the potential of condenser 22 until at the point C, the combined voltage is equal to the potential of the condenser 28 after which the upper diode begins to conduct, thus adding to the charge on the condenser 28 during the time from C to D. At the point D, the A. C. potential begins its return to zero, leaving the upper diode biased by the potential of the condenser 28, which is the D. C. output and approximately twice the A. C. peak voltage.

The effect of the values of the above components may now be considered. If the load is increased or such a condition is represented by decreasing the resistance 30, the condenser 28 discharges to a lower value of potential between the charging pulses. The ripple on the D. C. output thereupon increases and the points C and E fall nearer the zero axis, making the shaded area or conducting period C—D wider. Also, the time A—B is increased with A falling nearer the zero axis because more of the charge on the condenser 22 is now transferred to the output. The peak D. C. output will now be lower because this value depends upon the combined A. C. peak voltage at the point D, and the potential of the condenser 22 after discharging into the output circuit. The limit of this condition is when the resistance 30 equals zero and point A moves to A′, which means that the lower diode would conduct from the point A′ to the point B, and the upper diode 20 would conduct from B to D. The other limit is when the resistance 30 has an infinite value and the point A coincides with the point B, and C coincides with D. In other words, no energy is required in the output, and thus there is no transfer of energy from the condenser 22.

For a given resistance 30 let the capacitance of condenser 28 be infinitely large, and then let it be zero. The diodes will conduct for short intervals of time to supply the large capacitance and for approximately 180 degree periods when the capacitance is zero. That is the conduction periods C—D and A—B may vary from almost zero to almost 180 degrees behind the points B and D, which is about the same as was found above for changes in the resistance 30.

The output voltage must be a function of the input A. C. voltage and the capacitance 22, assuming that the diodes are of low resistance. Let the capacitance of the condenser 22 be increased, then the transfer of a pulse of energy to the output will have less effect in lowering the condenser potential, and the point A will move toward point B making the time of conduction smaller and current flow through the lower diode greater during the reduced time. The D. C. output voltage will increase and thus the point C will move toward D. However, this does not mean that the ripple will decrease, as appears in the drawing, but instead it will tend to increase in amplitude, due to higher D. C. output, and tend to decrease due to the longer period between charging pulses. The increase in the output voltage is due to the lower loss of potential on the condenser 22 while charging the condenser 28. If the capacitance of the condenser 22 is decreased, the point A will move toward A′ as a limit and point C will move toward B as a limit, while the output voltage will move toward a zero value. The conduction periods will be approximately 180 degrees for a small capacitance value of condenser 22.

If the resistance of the lower diode is increased by inserting a resistance in series with it, beginning with an infinitely large calue, the output voltage would be zero and the potential on the condenser 22 would be equal to the peak A. C. voltage at the point A′ in Fig. 2. Now if the lower diode resistance is slightly decreased, it will conduct for a period beginning at a point near A′ and extending almost 360 degrees to a point near the point D, during which some of the charge on the condenser 22 will be drained off. At the end of the conducting period of the lower diode, the upper diode begins to conduct and replaces the lost charge of the condenser 22 during a short interval of time which ends at the point D. There is now a small output voltage which determines the time after the point A′ at which the lower diode begins to conduct and the point C where the conduction of the lower diode ends and the other begins.

With a further decrease of the lower diode resistance, the conduction period of this diode shrinks until at zero resistance the point B will hold its position at the middle of the half wave and the conduction period will extend back of point B not more than 180 degrees. Retracing, the point C will move toward the zero axis and will fall on the zero axis when the instantaneous potential of the condenser 22 is equal and opposite in polarity so the conduction of the upper diode may begin with the negative half cycle of the A. C. input voltage. Further, a reduction of the lower diode resistance will cause the point C to move up toward the point D and the output voltage to increase.

In a similar manner it is apparent that the point D may be made to move ahead by increasing the resistance of the upper diode, and thereby introducing a lag in the charging of the output condenser.

*Grid control of rectifier.*—(1) If a grid is placed in the lower diode or it is replaced with a triode, the resistance of the rectifier may be varied corresponding to the applied signal voltage, and as previously explained, the output may be varied in this way from zero to approximately twice the peak A. C. input voltage. However, as the control grid is made more negative, the peak plate voltage increases due to the change in the potential of the condenser 22. This acts as a degenerative influence upon the grid and thereby reduces the amplification factor of the circuit. It is one of the objects of this invention to overcome this degenerative influence and increase the amplification of the circuit.

*Grid control of rectifier.*—(2) It is a small change but a great improvement to add grid control to the upper diode and to connect the grid through a resistance across the condenser 22. The resistance serves to limit the current through the grid and to prevent an undesirable discharge of condenser 22 during the charging cycle and the time before the tube 20 begins to conduct. Also, this grid resistor may be advantageous in providing a short R. C. time constant in connection with the grid to cathode interelectrode capacitance will be considered later.

The second grid control rectifier 20 was added for the purpose of limiting the current flow through the tube and thus the charge on the condenser 22 so that the peak voltages on the tube 10 would be reduced. Otherwise the cutoff bias for the tube 10 would depend upon a plate voltage equal to twice the peak A. C. supply voltage. The grid connection of tube 20 limits the peak plate voltage on the plate of the tube 10 to the peak A. C. supply voltage plus a maximum of the cutoff voltage of the tube 20. Working with this arrangement, two separate characteristic performances are revealed, depending upon the value of the capacitance 22.

With large values of capacitance 22, the conduction period of the tube 20 may extend ahead of the point D in Fig. 2, due to the increase in the resistance of the tube 20 as a charge builds up and the grid becomes biased.

When small values of the capacitance 22 are used in the voltage doubler, it is found that the beginning of the conduction period of the tube 20, or point C on the sine wave of Fig. 2 moved back, but the conduction period continued to end at the point D. The addition of the grid control in the tube 20 seems also to move the point D back along with the point C for high impedance values of the condenser 22. The resistance of tube 20 increases with the grid bias potential developed by charging condenser 22, but it appears that the tube resistance is of little consequence in the high impedance circuit with a rapidly advancing applied voltage until the higher resistance portion of the tube characteristic is reached near cutoff. It seems logical that the grid to cathode voltage of the tube 20 should lag behind the rising voltage against condenser 22 due to the tube input capacity and the gridleak resistance, and thus to allow the condenser 22 to charge to the potential beyond cutoff before the tube conduction is stopped. In this manner the lagging edge of the impulse could be very sharp and account for the fact that the pulse of current remains substantially constant through wide changes in A. C. plate supply voltage and load resistance. Of course the positive half cycle of the A. C. plate supply voltage must be regulated to note the independence from the supply voltage fluctuations.

*Advantages.*—One conductor which may be grounded, is common to the A. C. plate supply voltage, the input signal voltage, and the output of the amplifier. This feature provides for direct coupling in cascade and multistage applications, and for direct coupled feedback arrangements without separate plate supply voltages for each stage.

The output D. C. voltage may range from zero to approximately twice the peak A. C. plate supply voltage. Only in a voltage multiplier type of circuit will this be found. Where no transformers are employed and the A. C. line voltage is the operating voltage, this is an advantage in obtaining large D. C. output voltages for driving a low mu triode for example.

The tubes and the output are separated from the A. C. plate supply by a capacitor. The output may be made sensitive to the value of this capacitance. Also, in some applications, it may be advantageous as a safety feature to have the output loosely coupled to the A. C. line voltage.

A variety of output characteristics may be obtained, including impulses, sawtooth waves, and constant current. These advantages not only affect the performance and quality of the output, but also the general utility of this amplifier which may contribute to the overall simplicity of a complicated system.

This amplifier may be made independent of A. C. line voltage fluctuations by regulating only the alternate half cycles. This simplifies problems of regulation and contributes to the efficiency of operation.

A simple stage may be made regenerative with one condenser and one resistor added for a feedback circuit. This amplifier has the advantage over other A. C. operated amplifiers in the respect that the output ripple voltage may be conveniently converted to an A. C. voltage with the proper phase relation for regenerative feedback.

A single stage may be made regenerative, degenerative, or a combination of both, or superrenegerative. The advantages and utilization of these characteristics in an amplifier are well known, but other A. C. operated amplifiers do not have these advantages conveniently available.

Operated directly from A. C. line voltage, and without any transformers, this amplifier may be arranged in conventional circuits such as multistage amplification, direct current amplification schemes, phase inversion, push pull, multivibrator, trigger circuits, counting circuits, timing circuits, and the like.

There seems to be no apparent alternate method of construction except that for an output of impulses, sawtooth waves, or a constant current, where no input signal is used for control, the discharge means comprising the tube 10 in Fig. 1 may be replaced with almost any type of rectifier.

While a preferred embodiment of the invention has been described in detail, it should be regarded as an illustration or example rather than a limitation or restriction, as changes may be made in the construction, combination and arrangement of the parts without departing from the spirit and scope of the invention.

The invention described herein may be manufactured and used by or for the Government of the United States of America for governmental purposes without the payment of any royalties thereon or therefor.

What I claim is:

1. An alternating current operated amplifier comprising an alternating current supply, a capacitor, a triode tube and a load impedance all connected in series; the capacitor having a relatively high impedance and being connected in the cathode circuit of the triode tube; means for delaying biasing of the grid of the triode in response to the potential across the capacitor comprising the grid input capacity, a high resistance across the capacitor, and the connection of the grid through the high resistance; and means for discharging the capacitor and charging to the opposite polarity on alternate half cycles comprising a second triode with its plate connected to the cathode of the first tube, its cathode connected in a circuit between the load impedance and the alternating current supply, and having the grid thereof adapted to receive input signals.

2. An alternating current operated amplifier comprising an alternating current supply, a capacitor, a triode tube, and a load impedance all connected in series; the capacitor being connected in the cathode circuit of the tube, a high resistance across the capacitor and connected to the grid of the tube; the load impedance comprising a capacitor and a resistor connected in parallel; and a second triode tube having its plate connected to the cathode of the first tube, its cathode connected in a circuit between the load impedance and the alternating current supply, and its grid adapted to receive an input signal voltage.

3. An alternating current operated amplifier comprising an alternating current supply, a capacitor, a triode tube, and a load impedance all connected in series; the capacitor being connected in the cathode circuit of the tube, a high resistance across the capacitor and connected to the grid of the tube; the load impedance comprising a capacitor and a resistor connected in parallel; a second triode tube having its plate connected to the cathode of the first tube, its cathode connected in a circuit between the load impedance and the alternating current supply, and its grid adapted to receive an input signal voltage; and a series combination of a resistance and grid bias connected between the second triode tube grid and the alternating current supply in parallel with the load impedance to convert ripple voltage to an alternating current output voltage controllable by the input signal voltage.

4. An alternating current operated amplifier comprising an alternating current supply and a common grounded main conductor; a capacitor, a triode tube, and a load impedance all connected in series; the capacitor being connected in the cathode circuit of the tube, a resistor connected across the capacitor to the grid of the tube; the load impedance comprising a capacitor and a resistor connected in parallel and to the grounded conductor; a second triode tube having its plate connected to the cathode of the first tube, its cathode connected in a circuit to the main conductor between the load impedance and the alternating current supply, and its grid connected to an input signal source with a series combination of a resistance and a grid bias battery between the grid and the grounded main conductor.

5. An impulse generator comprising an alternating current supply, a capacitor, a triode tube, and a load impedance all connected in series, the capacitor having a relatively high impedance and being connected in the cathode circuit of the triode, means for delayed biasing of the grid of the triode in response to the potential across the capacitor comprising the grid input capacity and a high resistance across the capacitor connected to the grid of the triode, and means for discharging the capacitor and charging it to the opposite polarity on alternate half cycles of the current.

6. An impulse generator comprising an alternating current supply, a capacitor, a triode tube, and a load impedance all connected in series, the capacitor having a relatively high impedance and being connected in the cathode circuit of the triode, means for delayed biasing of the grid of the triode in response to the potential across the capacitor comprising the grid input capacity and a high resistance across the capacitor connected to the grid of the triode, and means for discharging the capacitor and charging it to the opposite polarity on alternate half cycles of the current, comprising a resistance connected from the cathode of the triode tube to a point between the load impedance and the alternating current supply.

7. An impulse generator comprising an alternating current supply, a capacitor, a triode tube, and a load impedance all connected in series, the capacitor having a relatively high impedance and being connected in the cathode circuit of the triode, means for delayed biasing of the grid of the triode in response to the potential across the capacitor comprising the grid input capacity and a high resistance across the capacitor being connected to the grid of the triode, and means for discharging the capacitor and charging it to the opposite polarity on alternate half cycles of the current comprising a rectifier connected from the cathode of the triode tube to a point between the load impedance and the alternating current supply.

8. An impulse generator comprising an alternating current supply, a capacitor, a triode tube, and a load impedance all connected in series, the capacitor having a relatively high impedance and being connected in the cathode circuit of the triode, means for delayed biasing of the grid of the triode in response to the potential across the capacitor comprising the grid input capacity and a high resistance across the capacitor connected to the grid of the triode, the load impedance comprising a parallel combination of a capacitance and an adjustable resistance, the adjustment to provide for varying the phase relation of the impulse of the current.

9. A sawtooth wave generator comprising an impulse generator comprising an alternating current supply, a capacitor, a triode tube, and a load impedance all connected in series, the capacitor having a relatively high impedance and being connected in the cathode circuit of the triode, means for delayed biasing of the grid of the triode in response to the potential across the capacitor comprising the grid input capacity and a high resistance across the capacitor connected to the grid of the triode, the load impedance comprising a capacitor and a resistor connected in parallel, and means for discharging the capacitor and charging it to the opposite polarity on alternate half cycles of the current.

10. In an alternating current operated amplifier, an alternating current supply, a capacitor, a triode tube and a load impedance connected in series, the capacitor having a relatively low impedance and being connected in the cathode circuit of the triode tube and a high resistance being connected across the capacitor to the grid of the tube, and a second triode tube with the plate connected to the cathode of the first tube, the cathode being connected in a circuit between the load impedance and the alternating current supply and the grid connected to receive input signals.

11. In an alternating current amplifier, an alternating current supply having input terminals, output terminals of which one is connected by a grounded conductor with one of the input terminals; a capacitor, a triode tube and a load impedance connected in series; the capacitor having a relatively low impedance and being connected in the cathode circuit of the triode tube, the grid having a high resistance connected thereto and across the capacitor; and a second triode tube with its plate connected to the cathode of the first tube and its cathode connected in a circuit to the grounded conductor between the load impedance and the alternating current grounded input terminal, and an input signal terminal to which the grid is connected.

12. An impulse generator comprising a source of electrical supply, a capacitor, a triode tube, and a load impedance all connected in series, the capacitor having a relatively high impedance, and means for delayed biasing of the grid of the triode in response to potential across the capacitor, comprising the grid capacity and a high resistance connected across the capacitor to the grid, and the capacitor being connected to the cathode of the triode tube.

13. An alternating current operated amplifier comprising an alternating current supply, a capacitor, a triode tube and a load impedance connected in series, the capacitor being connected in the cathode circuit of the triode tube and having a relatively low impedance, the grid having a relatively high resistance connected thereto and across the capacitor, and means comprising a second triode tube connected to the alternating current supply with its plate connected to the capacitor and the cathode of the first tube for discharging the capacitor and charging it to the opposite polarity on alternate half cycles.

VERL H. HIATT.

REFERENCES CITED

The following references are of record in the file of this patent:

UNITED STATES PATENTS

| Number | Name | Date |
|---|---|---|
| 2,219,292 | Bonwers | Oct. 29, 1940 |
| 2,256,859 | Bonwers | Sept. 23, 1941 |
| 2,403,956 | Schlesinger | July 16, 1946 |